US010588272B2

(12) United States Patent
Devroe et al.

(10) Patent No.: US 10,588,272 B2
(45) Date of Patent: Mar. 17, 2020

(54) AGRICULTURAL BALER

(71) Applicant: CNH Industrial America LLC, New Holland, PA (US)

(72) Inventors: Jeroen Devroe, Izegem (BE); Dieter Kindt, Vladslo (BE); Dries Liefooghe, Veurne (BE); Bram Rosseel, Snellegem (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/769,890

(22) PCT Filed: Oct. 20, 2016

(86) PCT No.: PCT/EP2016/075259
§ 371 (c)(1),
(2) Date: Apr. 20, 2018

(87) PCT Pub. No.: WO2017/068058
PCT Pub. Date: Apr. 27, 2017

(65) Prior Publication Data
US 2018/0303037 A1  Oct. 25, 2018

(30) Foreign Application Priority Data
Oct. 20, 2015  (BE) ................... 2015/5675

(51) Int. Cl.
*A01F 15/10* (2006.01)
*A01F 17/02* (2006.01)

(52) U.S. Cl.
CPC ............ *A01F 15/101* (2013.01); *A01F 17/02* (2013.01); *A01F 2015/102* (2013.01); *A01F 2015/107* (2013.01)

(58) Field of Classification Search
CPC .. A01F 15/10; A01F 15/101; A01F 2015/102; A01F 2015/107; A01F 29/10; B02C 2013/28672
(Continued)

(56) References Cited

U.S. PATENT DOCUMENTS 4,275,550 A  6/1981 Swenson et al.
4,962,632 A  10/1990 Schoonheere et al.
(Continued)

FOREIGN PATENT DOCUMENTS

EP  0339733 A1  11/1989
EP  1062860 A3 *  5/2001 ............. A01F 15/10
(Continued)

OTHER PUBLICATIONS

Machine Translation of EP1062860, Translated Oct. 4, 2018, 4 Pages.*

*Primary Examiner* — Gregory D Swiatocha
(74) *Attorney, Agent, or Firm* — Peter K. Zacharias; Patrick M. Sheldrake

(57) ABSTRACT

An agricultural baler including a bale chamber; a feeder duct communicating with the bale chamber; and a feeder operable within the feeder duct to accumulate a charge of crop material therein and then stuff that accumulated charge into the bale chamber. The baler further includes a conveying channel and a conveyor operable in the conveying channel to convey the crop material along a bottom wall of the conveying channel toward the feeder duct. The bottom wall of the conveying channel is adapted to be moved away from the conveyor; and the lower end part of the bottom wall of the feeder duct is attached to the movable bottom wall of the conveying channel.

8 Claims, 9 Drawing Sheets

(58) Field of Classification Search
USPC ...................................................... 100/188 R
See application file for complete search history.

(56) References Cited

U.S. PATENT DOCUMENTS

| 2013/0167498 | A1* | 7/2013 | Haycocks | ............... | A01F 15/08 |
| | | | | | 56/341 |
| 2014/0318391 | A1* | 10/2014 | Verhaeghe | .......... | A01F 15/0825 |
| | | | | | 100/35 |

FOREIGN PATENT DOCUMENTS

| WO | WO-2013072473 A1 * | 5/2013 | ......... A01F 15/0825 |
| WO | 2014129892 A1 | 8/2014 | |

* cited by examiner

US 10,588,272 B2

AGRICULTURAL BALER

TECHNICAL FIELD

The present invention relates to agricultural balers, and more specifically to rectangular balers, i.e. balers which produce bales of crop material which are rectangular in side view.

PRIOR ART

In EP0339733 there is disclosed a rectangular baler of basically conventional design in that it comprises a bale chamber or bale case in which a bale of crop material is formed, having an inlet opening formed therein communicating with a feeder duct. In the feeder duct feeder means are operable to accumulate a charge of crop material in the feeder duct and then stuff that accumulated charge into the bale chamber for compression by a reciprocable plunger operating within the bale chamber.

The bale chamber has a bottom wall in which the inlet opening is formed. The feeder duct has an upper end facing generally upwardly and communicating with the inlet opening in the bale chamber and a lower end facing generally in a forward direction. The upper boundary and the lower boundary of the feeder duct are formed by a top wall and a bottom wall, respectively, extending between the lower end and the upper end of the feeder duct.

In the baler disclosed in EP0339733 the feeder duct is provided with an opening in the bottom wall thereof and with releasable closure means for the opening. The releasable closure means for the opening are in the form of two doors. The doors are hingedly attached to respective opposed edges of the opening in the bottom wall of the feeder duct. A leading or front door, as seen relative to the direction of flow through the feeder duct, is hingedly attached to an edge of a lower end part of the bottom wall. A trailing or rear door is hingedly attached to an edge of an upper end part of the bottom wall. In normal operation of the baler the doors close the opening in the feeder duct. When a plugging of the feeder duct occurs, the feeder means are stopped and the doors are opened, allowing a plug of crop material to discharge onto the ground. Once the plug of crop material has been discharged to the ground, the doors are closed to resume normal operation.

In U.S. Pat. No. 4,275,550, it is shown that when the baler advances across the field picking up crop material, the material is continuously packed into the lower, open end of an upwardly curved duct leading to the bottom of the main baling chamber. A loading fork sweeps upwardly through the duct at regular intervals to stuff an accumulated charge of materials up into the baling chamber from the duct, and a packer at the mouth of the duct continuously adds new material to the duct at such a rate as to pre-compress the charge of materials accumulating within the duct prior to stuffing thereof into the bale chamber. If the pre-compressed charge reaches a certain predetermined density level between stuffing cycles, the duct may expand transversely via a spring-loaded sidewall thereof to keep the charge from substantially exceeding the selected density level yet permit the uninterrupted infeed of still further material pending the next operation of the loading fork.

SUMMARY OF THE INVENTION

Although the arrangement of at least one part of the bottom wall of the feeder duct being in the form of a door, such as in the baler disclosed in EP0339733, has been found satisfactory, it is an object of the present invention to further improve such an arrangement. In particular, its an object of the present invention to improve said arrangement in rectangular balers of the type comprising a conveying channel communicating with the lower end of the feeder duct for crop material to be conveyed to the feeder duct, and comprising conveying means operable in the conveying channel to convey the crop material along the bottom wall of the conveying channel to the feeder duct.

Thereto according to the present invention, the bottom wall of the conveying channel is adapted to be moved away from the conveying means, preferably by means of an actuator, and has a movable edge adjacent a lower end part of the bottom wall of the feeder duct, and the at least one part of the bottom wall of the feeder duct that is in the form of a door includes said lower end part of the bottom wall, wherein said lower end part of the bottom wall is attached to the movable edge of the bottom wall of the conveying channel.

The lower end part of the bottom wall of the feeder duct being in the form of a door that is attached to the movable edge of a bottom wall of the conveying channel that is adapted to be moved away from the conveying means allows for opening up the feeder duct in the lower end part thereof. The latter in particular by moving the lower end part of the bottom wall forming the door in the direction away from the top wall of the feeder duct by moving the bottom wall of the conveying channel away from the conveying means. This has the advantage that a plug of crop material that is stuck in the lower end of the feeder duct is more easily dislodged than in the prior art, as for instance described in EP0339733, wherein the lower end of the bottom wall of the feeder duct is fixedly positioned relative to the top wall of the feeder duct. As described in EP0339733 it may sometimes happen that the plug of crop material does not discharge onto the ground when the doors in the bottom wall of the feeder duct are opened. The feature of the present invention that a lower end part of the bottom wall of the feeder duct forms a door that is attached to a movable edge of the bottom wall of the conveying channel, addresses a possible cause of the plug of crop material not discharging onto the ground when the doors in the bottom wall of the feeder duct are opened, namely a plug of crop material being stuck in the lower end of the feeder duct. The feature of the present invention that a lower end part of the bottom wall of the feeder duct forms a door that is attached to a movable edge of the bottom wall of the conveying channel is in particular advantageous for removing a stuck plug of crop material that extends partly into feeder duct and partly into conveying channel. In general in rectangular balers having a conveying channel with conveying means, the region of the connected end parts of the conveying channel and the feeder duct are funnel shaped in the conveying direction. A stuck plug of crop material extending partly into feeder duct and partly into conveying channel is as a result of this funnel shape difficult to remove in the conveying direction. Furthermore, it is also difficult to remove such a stuck plug of crop material in the direction opposite to the conveying direction, the latter in particular in balers having a rotor cutter operable in the conveying channel for cutting the crop material in cooperation with a set of knives arranged on a bottom wall of the conveying channel, and for conveying the cut crop material toward the feeding duct, since the rotor cutter is generally arranged close to the inlet of the feeder duct. The feature of the present invention that the lower end part of the bottom wall of the feeder duct forms a door that is attached to a movable edge of the bottom wall of the conveying channel makes it possible to increase the space in the region of the connected end parts of the conveying channel and the feeder duct, thereby allowing a plug of crop material stuck in this region to be more easily dislodged than in the prior art, as for instance described in EP0339733, wherein the lower end of the bottom wall of the feeder duct is fixedly positioned relative to the top wall of the feeder duct. A plug of crop material that is stuck in the lower end of the feeder duct of a prior art baler as described herein above and is not discharging onto the ground when the doors in the bottom wall of the feeder duct are opened, will in a baler according to the invention either discharge under its own weight or at least be more easily dislodged. This allows for normal operation of the baler according to the invention to start sooner after a plugging of the feeder duct.

In an advantageous embodiment the door in the bottom wall of the feeder duct is fixedly attached to the movable bottom wall of the conveying channel. This allows for the door and the bottom wall of the conveying channel to be movable as a unit, thereby providing a constructively simple and robust implementation.

In a preferred embodiment thereof the movable wall of the conveying channel is movable by being pivotable. This feature allows for a relatively large opening to be provided by the door being fixedly attached to the bottom wall of the conveying channel with a relatively small movement of the bottom wall of the conveying channel.

As an advantageous alternative for the door being fixedly attached to the bottom wall of the conveying channel, the door in the bottom wall of the feeder duct is hingedly attached to the movable bottom wall of the conveying channel. Although this feature requires additional means for moving and holding the door in a desired position, this feature allow for more freedom in positioning the door. For instance by applying this feature, the door may be used to provide an opening in the bottom wall of the feeder duct by merely pivoting the door relative to the movable bottom wall of the conveying channel without moving the bottom wall of the feeder duct.

It is also foreseen that the door in the bottom wall of the feeder duct is fixedly attached to the movable bottom wall of the conveying channel, wherein the door comprises a first door part being fixedly attached to the bottom wall of the conveying channel along an edge of said first door part, and a second door part being hingedly attached to the first door part along an edge of the first door part opposite to the edge that is fixedly attached to the movable bottom wall of the conveying channel.

In a preferred embodiment the baler the lower end part of the bottom wall of the feeder duct that is in the form of a door is movable between a closed position wherein the edge of the lower end part opposite to the edge thereof that is attached to the bottom wall of the conveying channel is adjacent the edge of an adjacent part of the bottom wall of the feeder duct, thereby providing together with the adjacent part of the bottom wall of the feeder duct at least part of the lower boundary, and an opened position wherein the edge of the lower end part opposite to the edge thereof that is attached to the bottom wall of the conveying channel is positioned away from the edge of the adjacent part of the bottom wall of the feeder duct, thereby providing an opening in the lower boundary between the edge of the lower end part opposite to the edge thereof that is attached to the bottom wall of the conveying channel and the edge of the adjacent part of the bottom wall of the feeder duct. This allows for a plug of material stuck in the lower end part of the feeder duct to discharge onto the ground via the opening in the lower boundary when moving the lower end part of the feeder duct in the opened position.

According to an advantageous development thereof the at least one part of the bottom wall that is the form of a door also includes the adjacent part of the bottom wall of the feeder duct, wherein the adjacent part of the bottom wall of the feeder duct is also movable between the closed position and the opened position. Having an adjacent part of the bottom wall of the feeder duct also in the form of a door allows for a relatively large opening in the lower boundary provided by the lower end part of the bottom wall of the feeder duct and the adjacent part of the bottom wall of the feeder duct.

According to a further advantageous development, the baler is provided with means for selectively moving the lower end part of the bottom wall of the feeder duct that is in the form of a door and an adjacent part of the bottom wall of the feeder duct that also is in the form of a door between a closed position wherein the edge of the lower end part opposite to the edge thereof that is attached to the bottom wall of the conveying channel is adjacent the edge of the adjacent part of the bottom wall of the feeder duct thereby providing together with the adjacent part of the bottom wall of the feeder duct at least part of the lower boundary, and a partly opened position wherein the end part of the bottom wall and the adjacent part of the bottom wall of the feeder duct are positioned away from the top wall of the feeder duct over a relatively small distance thereby leaving the lower boundary in tact. This development allows for dislodging a plug of crop material stuck in the lower end part of the feeder duct by means of the feeder means that are operable in the feeder duct and subsequently removing the dislodged plug of crop material from the feeder duct by means of the feeder means by transferring the dislodged plug of crop material into the bale chamber. Dislodging the plug of crop material by means of the feeder means that are operable in the feeder duct is made possible by moving the lower end of the bottom wall of the feeder duct away from the top wall of the feeder duct, thereby releasing the pressure from the plug of crop material and proving space for the plug of crop material to move. By positioning the end part of the bottom wall of the feeder duct and an adjacent part of the bottom wall of the feeder duct away from the top wall of the feeder duct over a relatively small distance thereby leaving the lower boundary in tact, the plug of crop material can after being dislodged by means of the feeder means be transferred into bale chamber since the lower boundary provided by the end part of the bottom wall of the feeder duct and the adjacent part of the bottom wall of the feeder duct is still in tact. The baler including this advantageous development thus provides an alternative for discharging the plug of crop material onto the ground. This has as an advantage over prior art balers, as for instance described in EP0339733, that after removing the plug of crop material, there is no plug of crop material laying on the ground underneath the feeder duct, that, as described in EP0339733, hinders the doors of the feeder duct to be closed and the baler from being moved. There is no need for the plug of crop material laying on the ground to be removed from underneath the feeder duct for normal operation of the baler to resume. As an addition to the embodiment as described herein above wherein the end part of the bottom wall of the feeder duct and an adjacent part of the bottom wall of the feeder duct are movable in an open position wherein the adjacent edges of said parts are positioned away from each other such that there is an opening in the lower boundary provided by said parts of the bottom wall of the feeder duct, the feature of said parts of the bottom wall of the feeder duct being movable into a partly opened position, allows for both discharging the plug of crop material onto the ground and discharging the plug of crop material into the bale chamber. This allows for choosing the best method depending on the specific plug of crop material. Positioning said parts of the bottom wall of the feeder duct away from the top wall of the feeder duct over a relatively small distance in many cases allow the feeder means to dislodge the plug of crop material and transfer the dislodged crop material into the bale chamber. In other cases wherein the plug of crop material cannot be dislodged and discharged into the bale chamber, said parts of the bottom wall of the feeder duct can be moved into the open position thereof, allowing the plug of crop material to discharge onto the ground. The latter if needed in combination with dislodging the plug of crop material by oscillating or rocking the drive train to the feeder means as described in EP0339733, or by other actions.

In an advantageous embodiment of the baler according to invention including the lower end part of the bottom wall and an adjacent part of the bottom wall of the feeder duct being movable in a closed position and an open position and in addition including means adapted for selectively moving said parts of the bottom wall between a closed position and a partly opened position, the means adapted for selectively moving said parts of the bottom wall between a closed position and a partly opened position are releasable to allow said parts of the bottom wall of the feeder duct to be positioned in the opened position. Alternatively or additionally, the means are adapted to selectively move said parts of the bottom wall between the closed position, the partly opened position, and the opened position.

In an advantageous embodiment of the baler according to the invention having means adapted for selectively moving the lower end part of the bottom wall and an adjacent part of the bottom wall of the feeder duct between a closed position and a partly opened position, said means are manually operable. In an advantageous embodiment thereof the means comprise a manually operable latch.

According to an advantageous alternative development, the means adapted for selectively moving the lower end part of the bottom wall and an adjacent part of the bottom wall of the feeder duct between a closed position and a partly opened position comprise an actuator, in particular a linear actuator. This embodiment allows for moving said parts of the bottom wall without using manual force acting on said parts of the bottom wall. Furthermore, in particular in combination with a controller connected to the actuator for control thereof, this embodiment allows for moving said parts of the bottom wall from a remote location, for instance from an operator panel located on the baler or on the vehicle driving the baler. Still further, in particular in combination with a controller and sensor means for sensing a plugging of the feeder means, this embodiment allows for automated movement of said parts of the bottom wall. The latter in particular in case the controller is configured to move said parts of the bottom wall into the partly open position in case the sensor means detect a plugging of the feeder duct during operation. Additionally the controller can be configured to move said parts of the bottom wall back into the closed position in case the sensor means detect that the plugging has been resolved. In an advantageous embodiment said sensor means are configured for sensing the load on the feeder means during operation, and the controller is configured to move said parts of the bottom wall of the feeder duct into the partly open position in case load sensed by the sensor means exceed a certain value being indicative of a plugging of the feeder duct occurring or about to occur.

BRIEF DESCRIPTION OF THE FIGURES

The accompanying drawings are used to illustrate present non-limitative preferred exemplary embodiments of the present invention. The above stated and other advantages, features and objectives of the invention will become more apparent, and the invention better understood, from the following detailed description when read in combination with the accompanying drawings, in which.

DETAILED DESCRIPTION OF THE FIGURES

Figure 1:
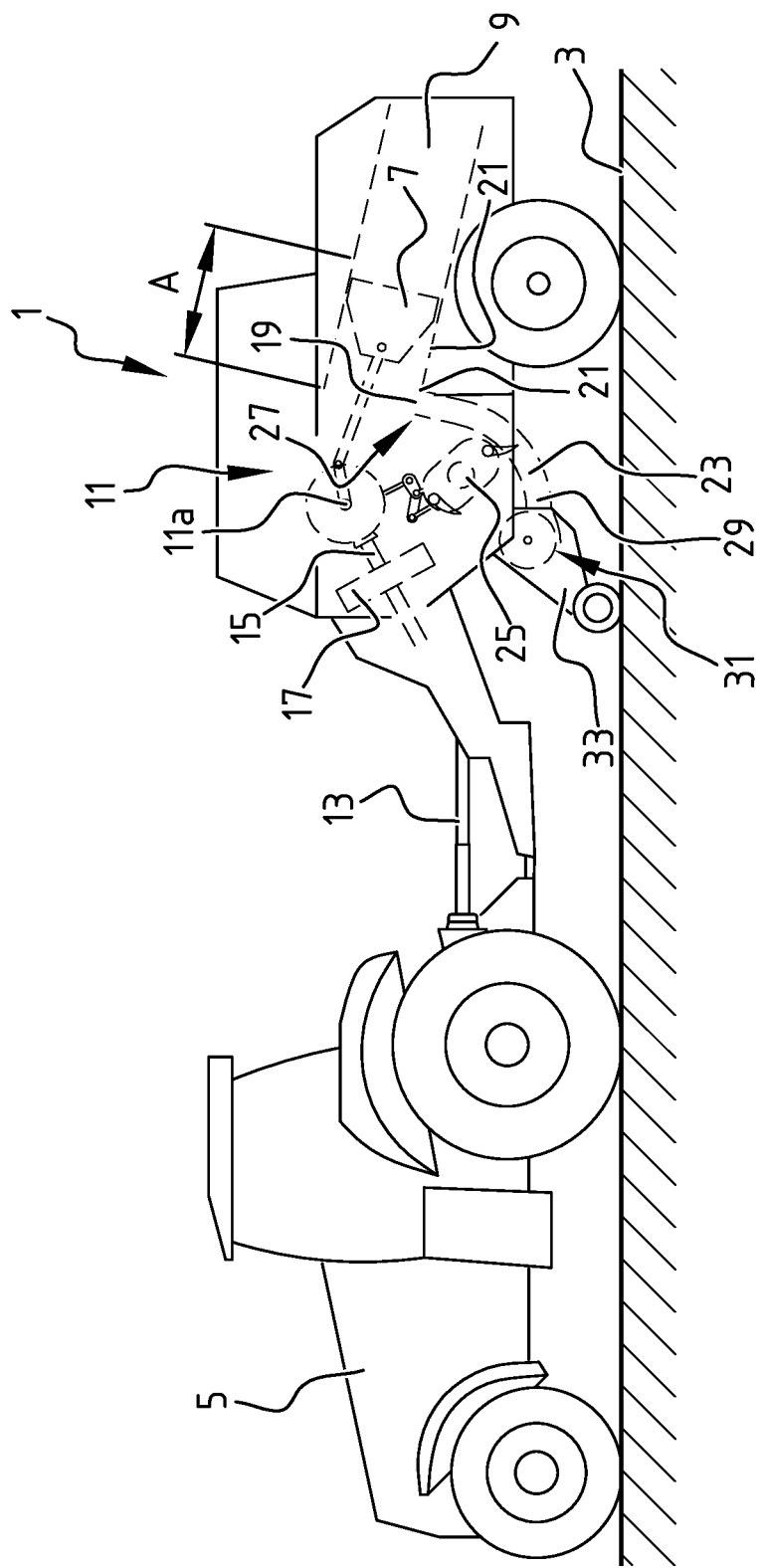
FIG. 1 shows a schematic side view of an embodiment of a baler according to the invention, drawn and driven by a tractor.

FIG. 1 shows a rectangular agricultural baler 1. Baler 1 can be moved forward over ground surface 3 by means of a tractor 5. The baler 1 is provided with a plunger 7 that during operation is moved reciprocally along a linear path A in bale chamber 9 by means of a crank mechanism 11, rotating about axis 11a, that is connected to plunger 7. Crank mechanism 11 is connected for driving via a drive shaft 13 to the motor of tractor 5. Tractor 5 is provided for this purpose with a power take-off device, also referred to as PTO. Drive shaft 13 connects an output shaft of the PTO of tractor 5 to an input shaft 15 of crank mechanism 11. A flywheel 17 is arranged on the input shaft of the crank mechanism.

The bale chamber 9 has an inlet opening 19 formed in the bottom wall 21 thereof. A feeder duct 23 communicates with the bale chamber 9 through the inlet opening 19 for charges of crop material to be transferred from the feeder duct 23 into the bale chamber 9. Feeder means 25 are operable within the feeder duct 23 to accumulate a charge of crop material therein and then stuff that accumulated charge into the bale chamber 9. The feeder duct 23 has an upper end 27 facing generally upwardly and communicating with the inlet opening 19 in the bale chamber 9 and a lower end 29 facing generally in a forward direction and communicating with a cutting unit 31. The cutting unit 31 is arranged for cutting crop material supplied by a pick-up device 33 and to convey the cut crop material into the feeder duct 23.

Figure 2:
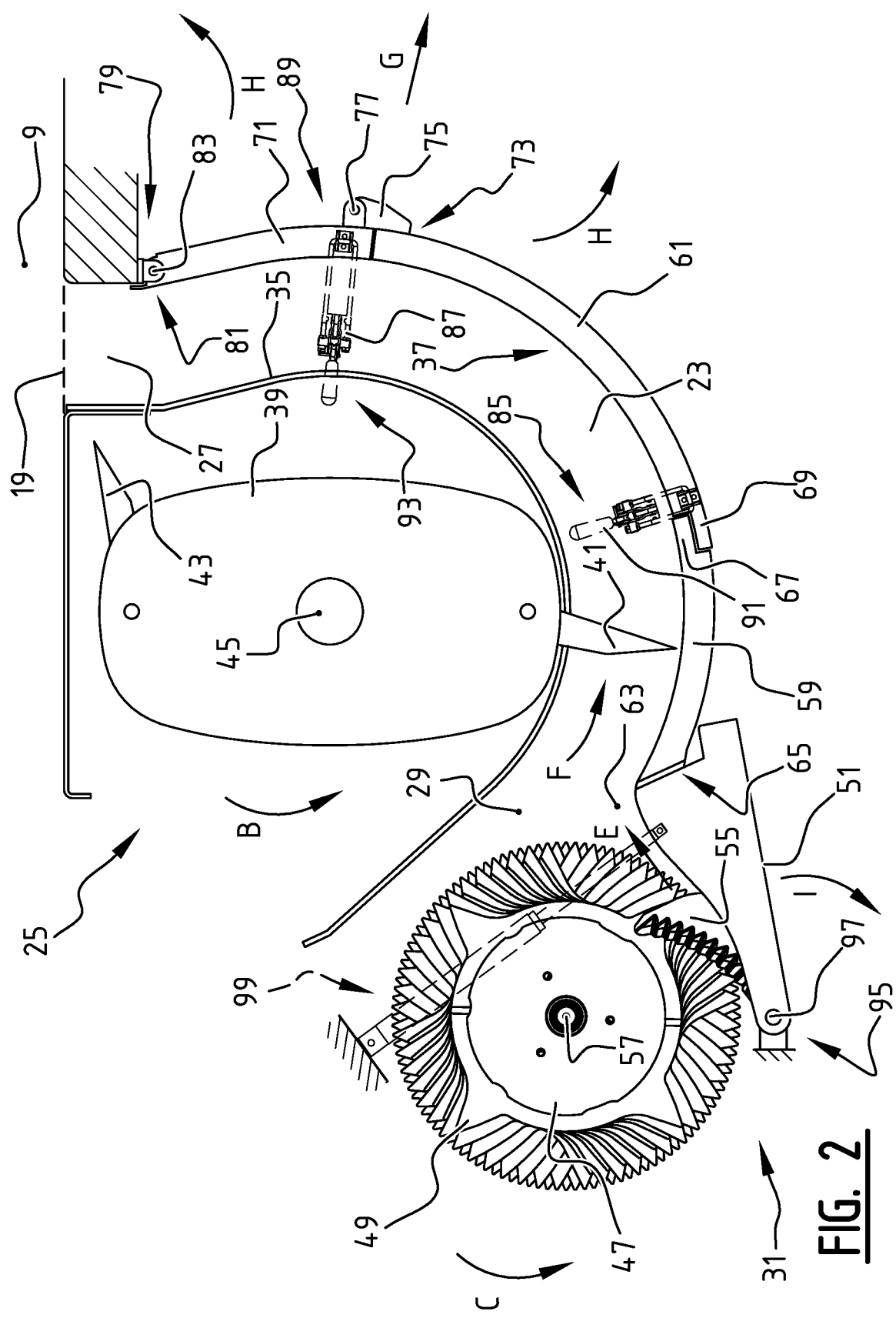
FIG. 2 shows in schematic side view the feeding duct of the baler of FIG. 1 with its doors in a closed position.

In FIG. 2 the feeder duct 23 is shown in more detail. The feeder duct is defined between a feeder duct top wall 35 and feeder duct bottom wall 37. The feeder duct top wall 35 provides an upper boundary for the feeder duct 23. The feeder duct bottom wall 37 provides a lower boundary for the feeder duct 23. In the feeder duct 23 feeder means 25 are operable. The feeder means 25 include a rotatable drum 39 having sets of tines 41, 43 arranged thereon. In operation the drum 39 is rotated in the direction of arrow B about axis of rotation 45. The feeder means are configured for causing the outer ends of the tines to be moved along a path of movement through the feeder duct 23, thereby conveying cut crop material that has been conveyed by the cutting unit 31 into the lower end 29 of the feeder duct 23, from the lower end 29 of the feeder duct 23 toward the upper end 27 thereof.

The cutting unit 31 is provided with cutter means in the form of a rotor 47 carrying a set of tines 49. A cutting unit bottom distant from the rotor 47 forms a bottom wall 51 of a conveying channel through the cutting unit 31. Cutting blades 55 protrude from the cutting unit bottom 51 through the conveying channel. During operation the rotor 47 is rotated in the direction of arrow C about axis of rotation 57. Crop material fed to the cutting unit 31 by means of the pickup device 33 in the direction of arrow D is conveyed by means of the rotor 47 through the conveying channel along the cutting blades such that the crop material is cut. The rotor 47 conveys the cut crop material further towards the inlet of the feeder duct at the lower end of the feeder duct 23 in the direction of arrow E. Once in the feeder duct 23, the cut crop material is engaged by the tines 41, 43 of the feeder means for conveying the cut crop material from the lower end 29 of the feeder duct 23 toward the upper end 27 thereof in the direction of arrow F. In the feeder means the cut crop material is accumulated in the upper end thereof to form a charge of cut crop material. After forming a charge of crop material, the feeder means 25 stuff the charge of crop material through the inlet 19 of the bale chamber 9 at the upper end 27 of the feeder duct 23 into the bale chamber 9.

The feeder duct 23 is provided with two doors: a front door 59 and a rear door 61. In FIG. 2 the front door 59 and the rear door 61 are shown in their closed position. The front door 59 is formed by a lower end part of the bottom wall 37. The front door 59 extends between an inlet 63 of the feeder duct 23 at the lower end 29 thereof and the rear door 61. Front door 59 is at one edge 65 thereof attached to the bottom wall 51 of the cutting unit 31. The other edge 67 of the front door 59 is adjacent an edge 69 of the rear door 61. As shown in FIG. 2, the adjacent edges 67, 69 overlap in the closed position of the doors 59, 61.

The rear door 61 is formed by a central part of the bottom wall that extends between the front door 59 and an upper end part 71 of the bottom wall 37. The rear door 61 has one edge 69 adjacent the front door 59. At the opposite edge 73, the rear door is hingedly attached to the upper end part 71 of the bottom wall 37 by means of a hinge 75 defining a pivot axis 77. The upper end part 71 of the bottom wall 37 is at its edge 79 opposite to the edge 73 to which the rear door 61 is attached, hingedly attached at the end 27 of the feeder duct 23 near the inlet 19 of the bale chamber 9 by means of a hinge 81 defining a pivot axis 83.

Rear door 61 and the upper end part 71 of the bottom wall to which the rear door 61 is hingedly attached are held in the closed position thereof by means of a first latch 85 engaging the rear door 61 near its edge 69 that is adjacent the front door 59, and by means of a second latch 87 engaging the upper end part 71 of the bottom wall 37 near its edge 89 to which the rear door 61 is hingedly attached.

Front door 59 is at one edge 65 thereof held in the closed position by being attached to the bottom wall 51 of the cutting unit 31. At its opposite edge 67 adjacent the rear door 61, the front door 59 is held in the closed position by means of the first latch 85 by virtue of a stepped overlap between the edge 67 of the front door 59 and the edge 69 of the rear door 61, wherein the edge 69 of the rear door 61 engages underneath the edge 67 of the front door 59.

The first latch 85 is provided with a lever 91, that allows the point where the first latch 85 engages the rear door 61 to be manually moved away from the top wall 35 of the feeder duct 23 in the direction of arrow G, thereby moving the rear door 61 away from the top wall 35 of the feeder duct 23 in the direction of arrow H by rotation about the axis of rotation 77. Once the rear door 61 is moved away from the top wall 35 of the feeder duct 23 by means of the first latch 85, the upper end part 71 of the bottom wall 37 may be moved by means of the second latch 87. The second latch 87 is provided with a lever 93, that allows the point where the second latch 87 engages the upper end part 71 of the bottom wall 37 to be manually moved away from the top wall 35 of the feeder duct 23 in the direction of arrow G, thereby moving the upper end part 71 of the bottom wall 37 away from the top wall 35 of the feeder duct 23 in the direction of arrow H by rotation about the axis of rotation 83.

The bottom wall 51 of the cutting unit 31 is hingedly attached to a frame part of the baler by means of a hinge 95 defining a pivot axis 97, and movable by means of a linear actuator 99 in the direction of arrow I away from the rotor 47. By moving the bottom wall 51 of the cutting unit 31 by means of a linear actuator 99 in the direction of arrow I, the front door 59 that is attached to the bottom wall 51 of the cutting unit 31 can be moved away from the top wall 35 of the feeder duct 23 in the direction of arrow I. During normal operation of the baler, the front door 59 and rear door 61 are in the shown closed position.

Figure 3:
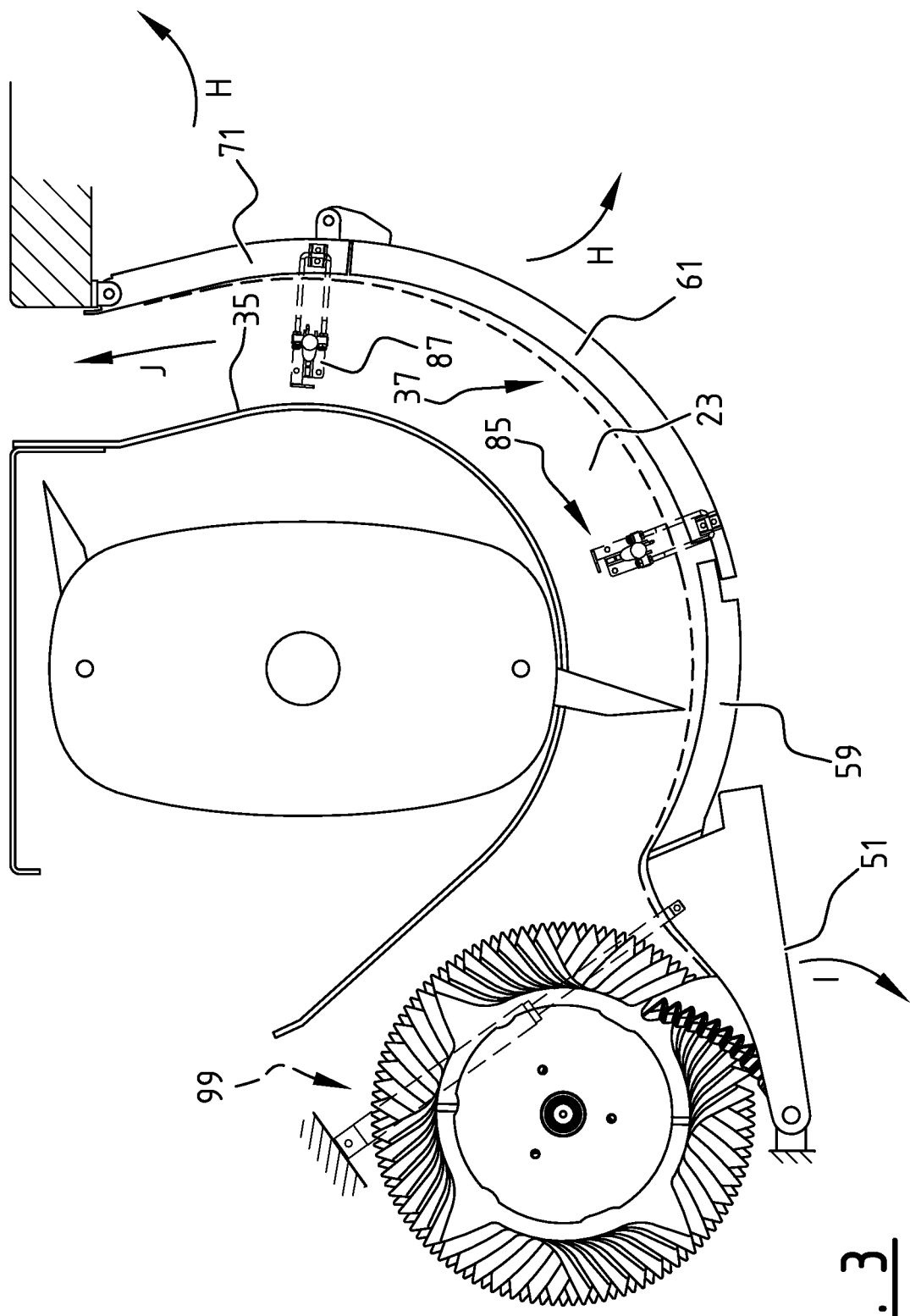
FIG. 3 shows in schematic side view the feeding duct of the baler of FIG. 1 with its doors in a partly open position.

In FIG. 3 is shown that by moving the front door 59 and the rear door 61 away from the top wall 35 of the feeder duct 23 by means of the linear actuator 99 and the latches 85, 87, respectively, the front door 59, rear door 61 and upper end part 71 of the bottom wall 37 are position in a partly opened position. The latches 85, 87 thus provide means adapted for selectively moving the rear door 61 and the upper end part 71 of the bottom wall 37 between a closed position and a partly opened position. The linear actuator 99 provides means adapted for selectively moving the adjacent front door 59 between a closed position and a partly opened position. In the partly opened position, the lower boundary provided by the front door 59, rear door 61 and upper end 71 of the bottom wall 37 is maintained in tact, albeit that it is moved away from the top wall of the feeder duct 23 relative to the lower boundary provided in the closed position indicated by the dotted line. In the shown partly opened position, the space in the feeder duct is increased relative to the situation shown in FIG. 2 with the front door 59 and rear door 61 in the closed position thereof. In case during normal operation a plug of crop material is stuck in the feeder duct 23, preventing further operation, moving the front door 59, rear door 61 and upper end 71 of the bottom wall 37 in the partly opened position, the increased space in the feeder duct 23 releases the pressure on the plug of crop material and provides additional space for the plug of crop material to move. This allows in many cases to dislodge the plug of crop material and remove the plug of crop material from the feeder duct 23 into the bale chamber 9 in the direction of arrow J, by causing the feeder means 25 to resume operation while the front door 59, rear door 61, and upper end part 71 of the bottom wall 37 of the feeder duct 23 are in the partly opened position. After removal of the plug of crop material from the feeder duct 23, the front door 59, rear door 61, and upper end part 71 of the feeder duct 23 can be positioned in the closed position by means of the linear actuator 99 and the latches 85, 87, respectively. With the front door 59, rear door 61, and upper end part 71 of the feeder duct 23 positioned in the closed position, normal operation of the baler can resume.

Figure 4:
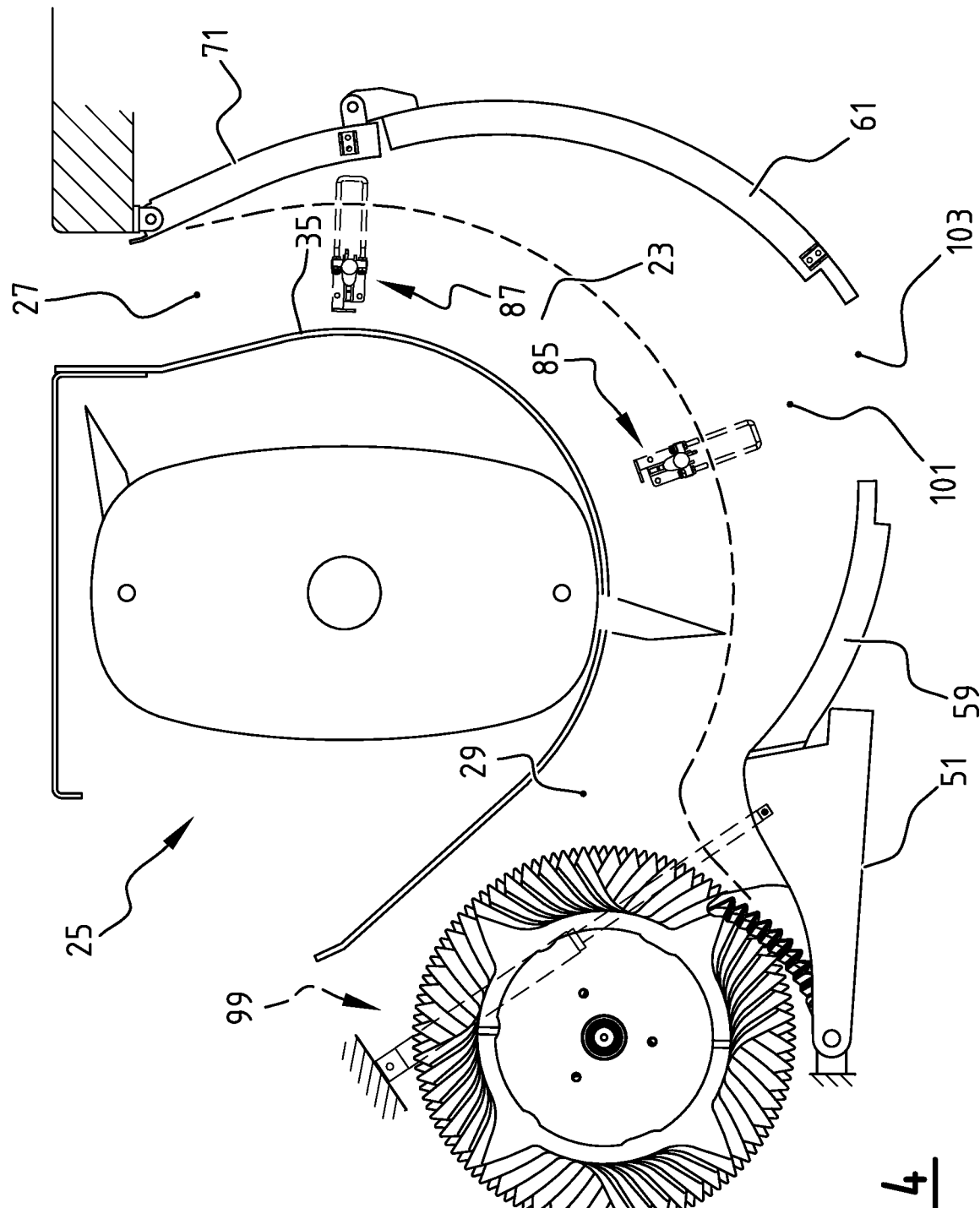
FIG. 4 shows in schematic side view the feeding duct of the baler of FIG. 1 with its doors in an opened position according to a first configuration.

In case a stuck plug of crop material cannot be dislodges and/or removed from the feeder duct 23 by means of the feeder means 25 with the front door 59, rear door 61, and upper end part 71 of the feeder duct 23 in the partly opened position, the front door 59, rear door 61, and upper end part 71 of the feeder duct 23 can be positioned in an open position in which they do no longer provide the lower boundary of the feeder duct 23. To that effect, starting from the situation shown in FIG. 3, the rear door 61 is releasable from the first latch 85, the upper end part 71 of the bottom wall 37 is releasable from the second latch 87, such that the rear door 61 and the upper end part of the bottom wall 71 can be moved further away from the top wall of the feeder duct in the direction of arrow H. Additionally, the front door 59 can be moved further away from the top wall 35 of the feeder duct 23 by further moving the bottom wall 51 of the cutting unit 31 by means of the linear actuator 99 in the direction of arrow I. The result is shown in FIG. 4. In the opened position of the front door 59, rear door 61, and upper end part 71 of the feeder duct 23, they do no longer provide a continuous lower boundary of the feeder duct 23. The further increased space in the feeder duct 23 at both ends 27, 29 thereof as well as in a central part 101 of the feeder duct 23 further releases pressure on a stuck plug of crop material and provides additional space for movement. A plug of crop material stuck in the feeder duct 23 can in this position of the front door 59, rear door 61, and upper end part 71 of the feeder duct discharge onto the ground underneath the feeder duct 23 through an opening 103 between the adjacent edges 67, 69 of the front door 59 and the rear door 61, either under influence of its own weight or by additional dislodging, for instance by oscillating or rocking the drive train 13, 15, 17 to the feeder means. After removal of the plug of crop material from the feeder duct 23, the front door 59, rear door 61, and upper end part 71 of the feeder duct can be positioned in the closed position again. The front door 51 can be positioned in the closed position by means of the linear actuator 99. The rear door 61 and upper part 71 of the bottom wall 37 can be positioned in the closed position by engaging the first and second latches 85, 87 and 12 subsequently operating the latches 85, 87 to move the rear door 61 and upper part 71 of the bottom wall 37 into the closed position. With the front door 59, rear door 61, and upper end part 71 of the feeder duct 23 positioned in the closed position, normal operation of the baler can resume.

Figure 5:
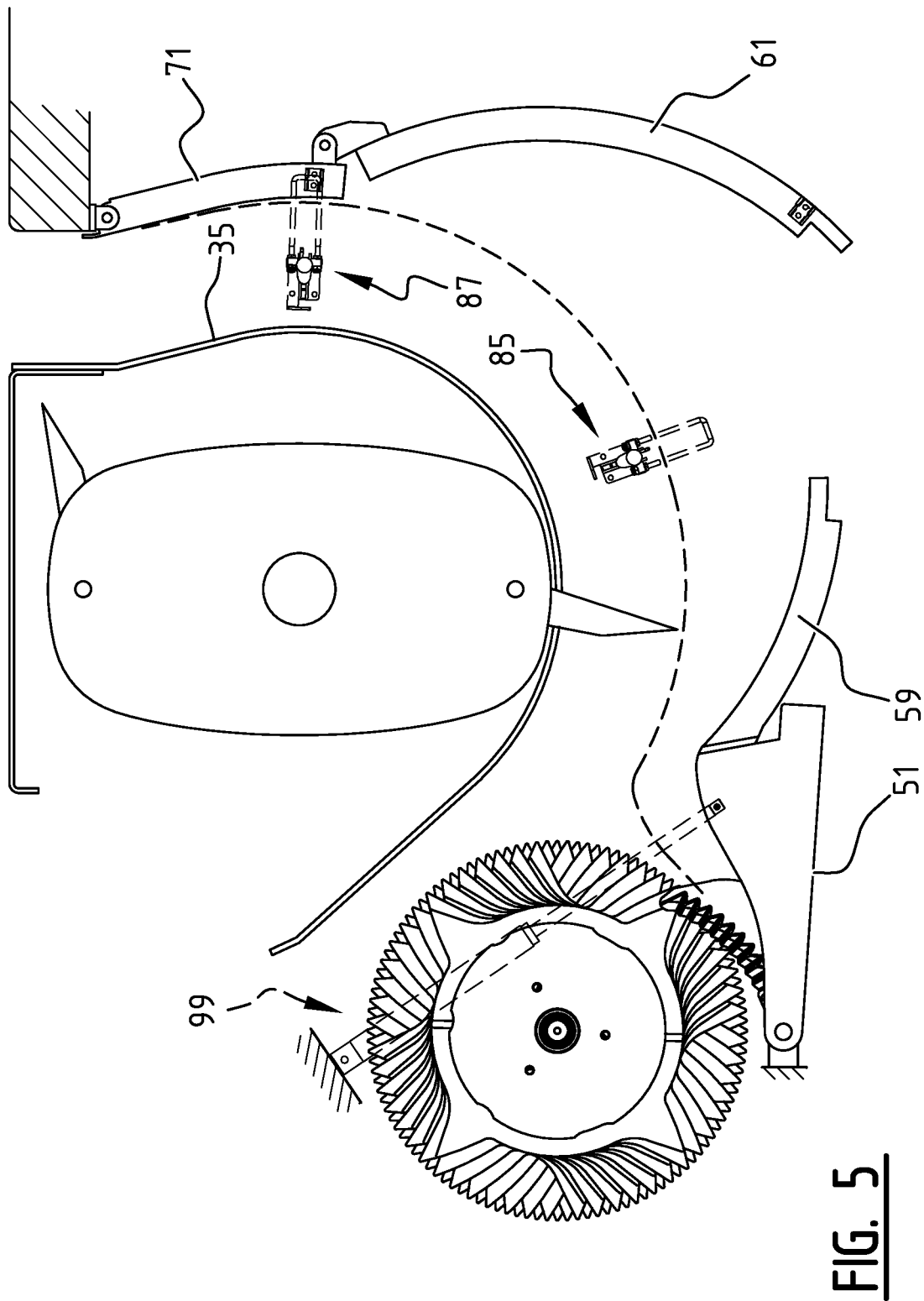
FIG. 5 shows in schematic side view the feeding duct of the baler of FIG. 1 with its doors in the opened position according to a second configuration.

In FIG. 5 is shown that it is also possible to position the front door 51 and rear door 61 in the opened position, while the upper end part 71 of the bottom wall 37 is held in the closed position by means of the second latch 87.

Figure 6:
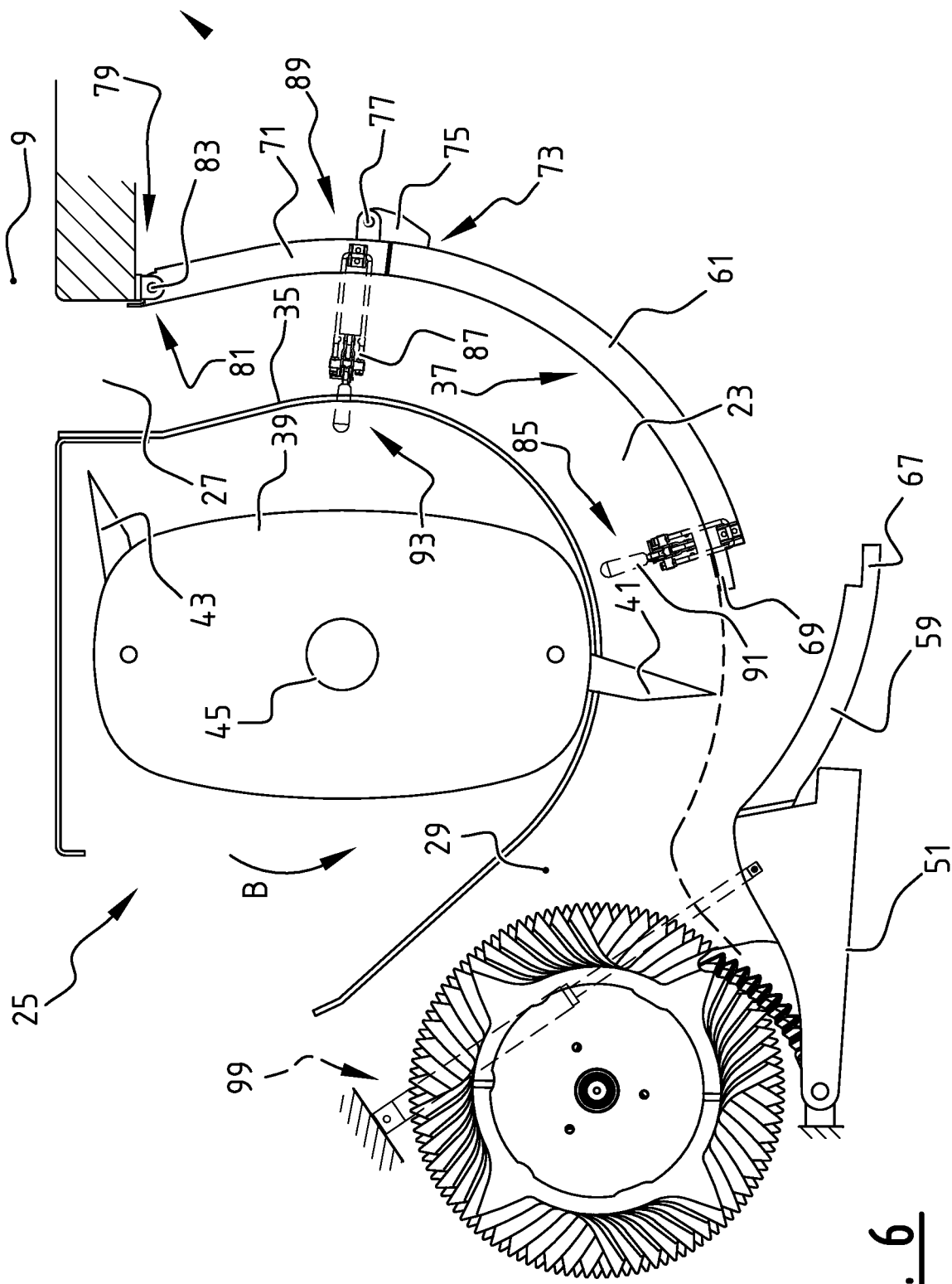
FIG. 6 shows in schematic side view an alternative embodiment of the feeder duct 23 of the baler 1 shown in FIGS. 1 to 5.

In FIG. 6 an alternative embodiment of the feeder duct 23 of the baler 1 shown in FIGS. 1 to 5 is shown, wherein the adjacent edges 67, 69, have a reversed orientation such that in the closed position of the doors 59, 61 the overlap is reversed. As a result, it is possible to position the front door 59 in the opened position, while the rear door 61 and the upper end part 71 of the bottom wall 37 are held in the closed position by means of the latches 85, 87. Furthermore, this FIG. 6 illustrates that the feature of the front door 59 being attached to the movable edge of the bottom wall 51 of the conveying channel can also be applied in an alternative embodiment of the baler 1 shown in the figures wherein there is no movable rear door 61 and/or movable upper end part 71 of the bottom wall 37.

Figure 7:
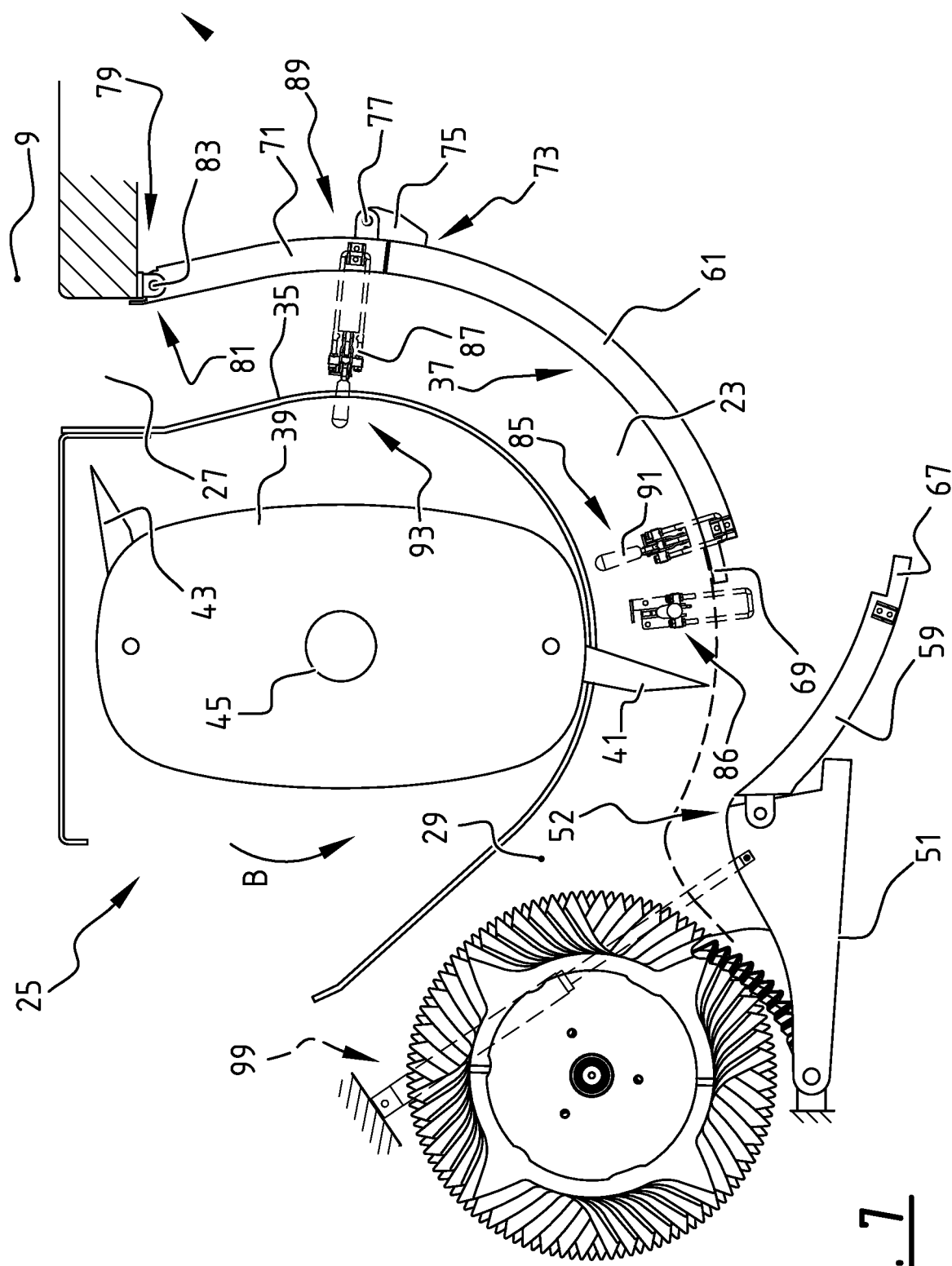
FIG. 7 shows in schematic side view an alternative embodiment of the feeder duct 23 of the baler 1 shown in FIG. 6.
Figure 8:
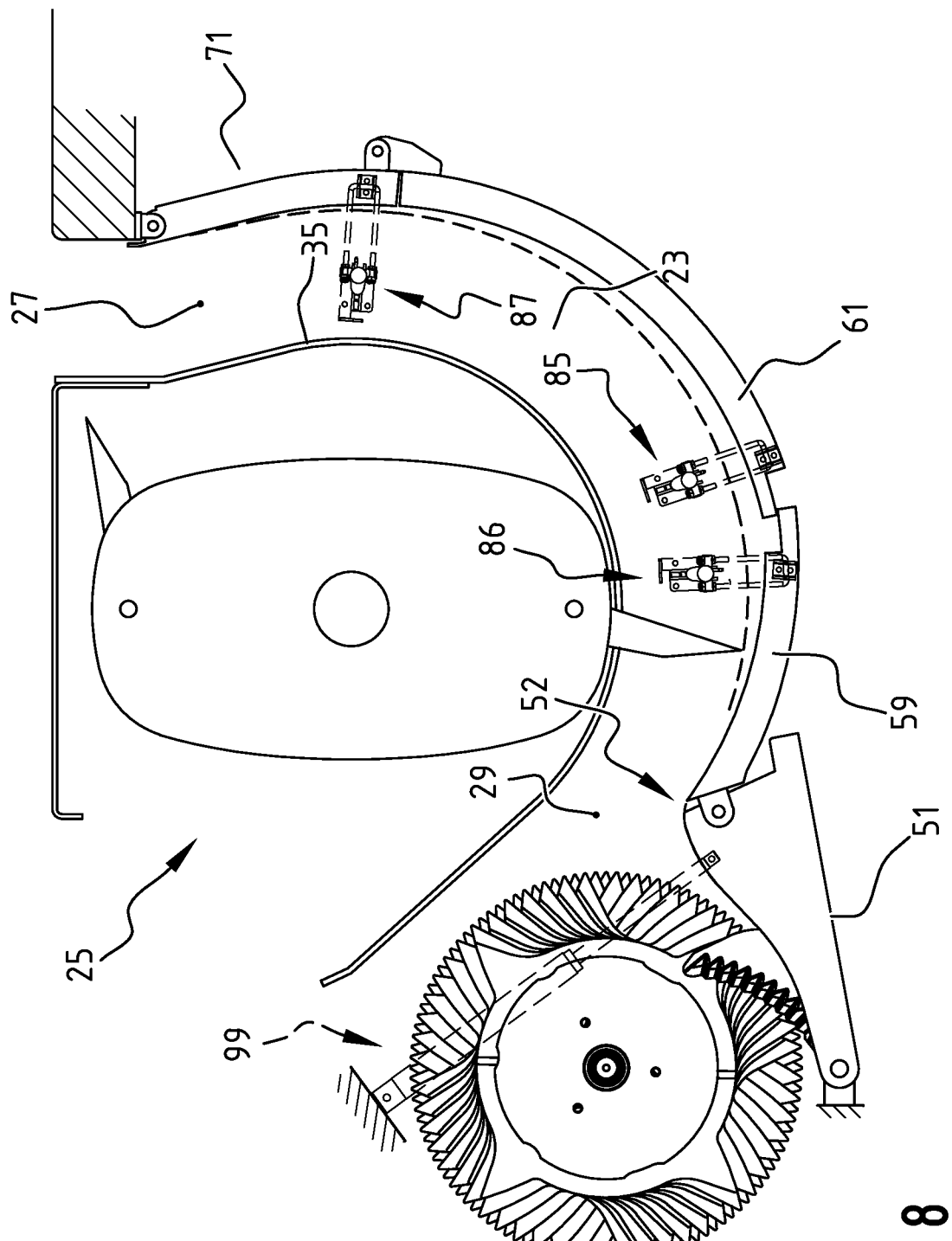
FIG. 8 shows in schematic side view the feeding duct of the baler of FIG. 7 with the doors in a different position.

In FIG. 7 an alternative embodiment of the feeder duct 23 of the baler 1 shown in FIG. 6 is shown, wherein the front door 59 is hingedly attached to the bottom wall 51 of the cutting unit 31 by means of a hinge 52. This allows in the opened position of the front door 59 for a larger opening provided by the front door 59. Additionally, as shown in FIG. 8, this allows to position the front door 59, rear door 61, and upper end part 71 of the bottom wall 37 in the partly opened position, while the bottom wall 51 of the cutting unit 31 remains in the closed position. To be able to position front door 59 in its partly opened position and in its closed position, an additional latch 86 is provided that is adapted to be releasable coupled to the front door 59. Alternatively, the adjacent edges 67, 69, have a reversed orientation such that in the closed position of the doors 59, 61 the overlap is reversed. The latter allows the front door 59 to be positioned in its partly opened position and in its closed position without the provision of latch 86.

In an alternative embodiment of the embodiment shown in FIGS. 7 and 8, the font door 59 has a first part that is fixedly attached to the bottom wall 51 of the cutting unit 31 and a second part that is hingedly attached to the first part.

Figure 9:
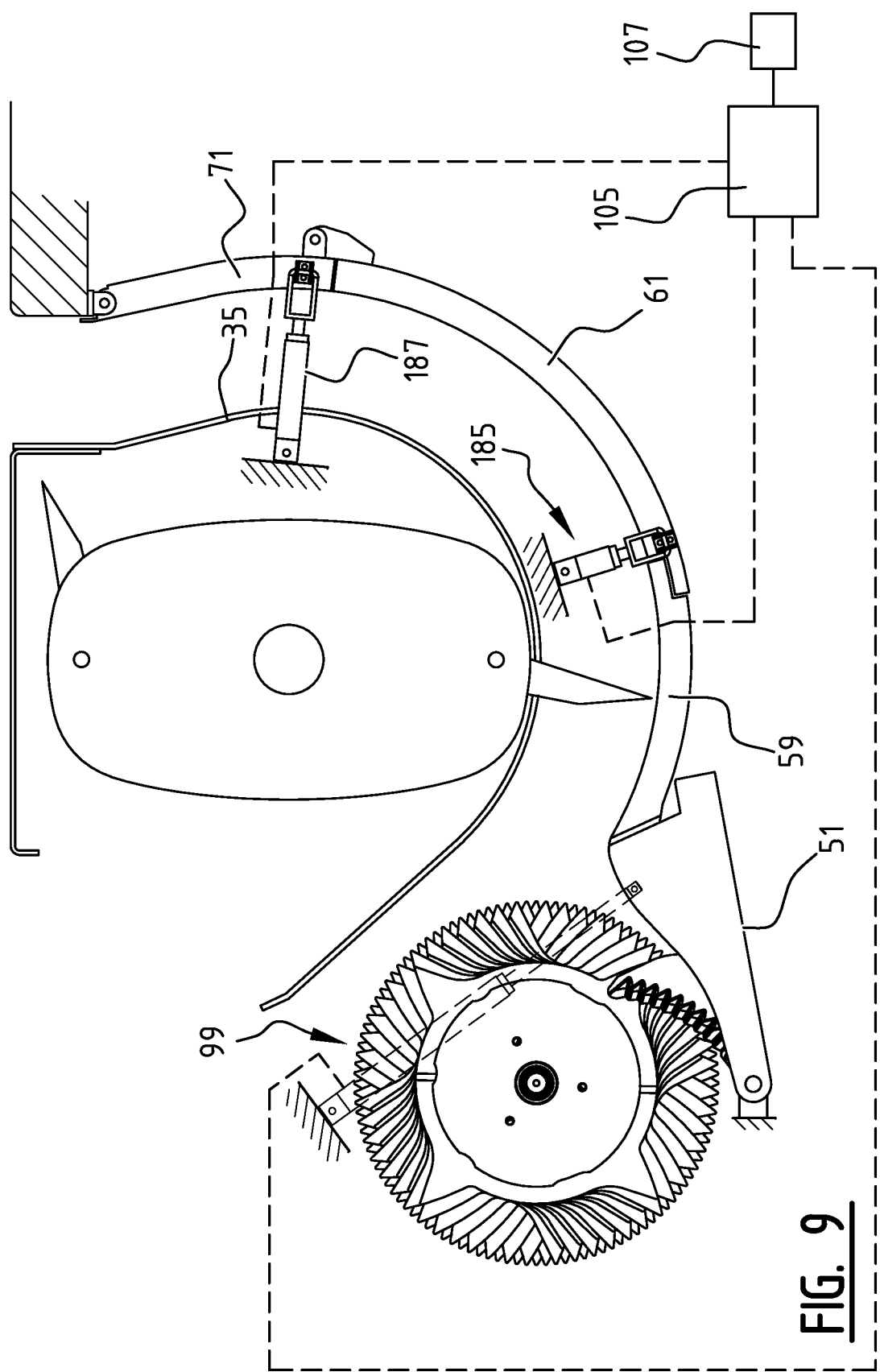
FIG. 9 shows in schematic side view the feeding duct of the baler of FIG. 1 in a further alternative embodiment.

In FIG. 9 an alternative embodiment of the feeder duct 23 of the baler 1 shown in FIGS. 1 to 6 is shown, wherein the manually operated, first and second latches 85, 87, have been replaced by a first and second linear actuator 185, 187. The first and second linear actuators 185, 187 replace the latches as means for holding the rear door 61 and the upper end part 71 of the bottom wall to which the rear door 61 is hingedly attached in the closed position. The linear actuators 185, 187 are adapted for selectively moving the rear door 61 and the upper end part 71 of the bottom wall to which the rear door 61 is hingedly attached between the shown closed position and the partly opened position shown in FIG. 3. The linear actuators 185, 187, as well as the linear actuator 99, are connected to a controller 105 for controlling the linear actuators 99, 185, 187. Sensor means 107 are provided, that are connected to the controller 105 and adapted for detecting plugging of the feeder duct 23. The controller 105 is configured of controlling the linear actuators, 99, 185, 187 such that the front door 59, the rear door 61, and the end part 71 of the bottom wall 37 are moved into the partly opened position that is shown in FIG. 3 when a plugging of the feeder duct 23 is detected by said sensor means 107. The rear door 61 is releasable from the first linear actuator 185, the upper end part 71 of the bottom wall 37 is releasable from the second linear actuator 187, such that the rear door 61 and the upper end part of the bottom wall 71 can be moved into the opened position that is shown in FIG. 4. In stead of being releasable from the first linear actuator 185 and the second linear actuator 187 in order for the rear door 61 and the upper end part 71 of the bottom wall 37 to be moved into the opened position, the first linear actuator 185 and the second linear actuator 187 are configured and arranged for moving the rear door 61 and the upper end part 71 of the bottom wall 37 from the partly opened position that is shown in FIG. 3 into the opened position that is shown in FIG. 4.

Although the principles of the invention have been set forth above with reference to specific embodiments, it must be understood that this description is given solely by way of example and not as limitation to the scope of protection, which is defined by the appended claims.

The invention claimed is:

1. An agricultural baler comprising:
a bale chamber having an inlet opening formed therein;
a feeder duct communicating with the bale chamber through the inlet opening for a charge of crop material to be transferred from the feeder duct into the bale chamber, the feeder duct having an upper end facing generally upwardly and communicating with the inlet opening in the bale chamber and a lower end facing generally in a forward direction;
a plunger reciprocable within the bale chamber to compress the charge of crop material received from the feeder duct to form a bale;
a feeder operable within the feeder duct to accumulate the charge of crop material therein and then stuff the charge of crop material into the bale chamber;
a conveying channel communicating with the lower end of the feeder duct for the charge of crop material to be conveyed to the feeder duct, the conveying channel having a bottom wall; and
a conveyor operable in the conveying channel to convey the charge of the crop material along the bottom wall of the conveying channel toward the feeder duct,
wherein:
the feeder duct has a top wall and a bottom wall extending between the lower end and the upper end of the feeder duct, the top wall providing an upper boundary of the feeder duct and the bottom wall providing a lower boundary of the feeder duct,
the bottom wall of the feeder duct includes a first door and a second door selectively engageable to the first door, the first door being formed by a lower end part of the bottom wall of the feeder duct, and the second door being formed by an adjacent part of the bottom wall of the feeder duct,
the bottom wall of the conveying channel is configured to be moved away from the conveyor and has a movable edge that is adjacent to the lower end part of the bottom wall of the feeder duct,
the first door comprises a leading edge that is directly attached to the movable edge of the bottom wall of the conveying channel, and
the lower end part of the bottom wall of the feeder duct that forms the first door is hingedly attached to the bottom wall of the conveying channel.

2. The baler according to claim 1, wherein the conveyor comprises a rotor cutter operable in the conveying channel for cutting the charge of crop material in cooperation with a set of knives arranged on the bottom wall of the conveying channel, and for conveying the cut charge of crop material toward the feeder duct.

3. The baler according to claim 1, wherein the movable edge of the conveying channel is movable by being pivotable.

4. The baler according to claim 1, wherein the lower end part of the bottom wall of the feeder duct that forms the first door is movable between a closed position and an opened position, and the leading edge of the first door remains permanently attached to the movable edge of the bottom wall of the conveying channel in both of the closed and opened positions.

5. The baler according to claim 1, further comprising a latch configured for selectively moving the lower end part of the bottom wall of the feeder duct and the second door between a closed position wherein an edge of the lower end part of the bottom wall of the feeder duct opposite to an edge thereof that is attached to the bottom wall of the conveying channel is adjacent an edge of the adjacent part of the bottom wall of the feeder duct thereby providing together with the adjacent part of the bottom wall of the feeder duct at least part of the lower boundary, and a partly opened position wherein the lower end part of the bottom wall of the feeder duct and the adjacent part of the bottom wall of the feeder duct are positioned away from the top wall of the feeder duct, while leaving the lower boundary intact.

6. The baler according to claim 5, wherein the latch is releasable to allow the lower end part of the bottom wall of the feeder duct and the adjacent part of the bottom wall of the feeder duct to be positioned in an opened position, wherein the latch is configured to selectively move the lower end part of the bottom wall of the feeder duct and the adjacent part of the bottom wall of the feeder duct between the closed position, the partly opened position, and the opened position, and wherein, in the opened position, the edge of the lower end part of the bottom wall of the feeder duct opposite to the edge thereof that is attached to the bottom wall of the conveying channel is positioned away from the edge of the adjacent part of the bottom wall of the feeder duct, thereby providing an opening in the lower boundary between the edge of the lower end part of the feeder duct opposite to the edge thereof that is attached to the bottom wall of the conveying channel and the edge of the adjacent part of the bottom wall of the feeder duct.

7. The baler according to claim 5, wherein the latch is manually operable.

8. The baler according to claim 1, further comprising a first actuator configured for selectively moving the lower end part of the bottom wall of the feeder duct.

* * * * *